March 4, 1958   P. D. BECKER   2,825,379
CYLINDRICAL NUT WITH SPRING ARM RETAINER
Filed Nov. 23, 1951
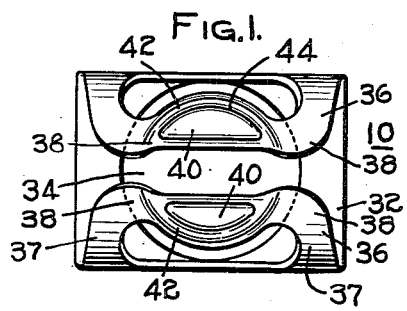
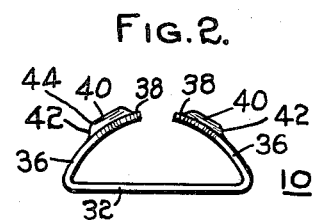
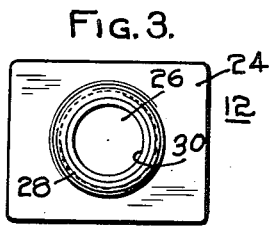
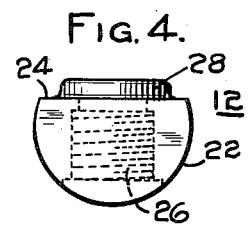
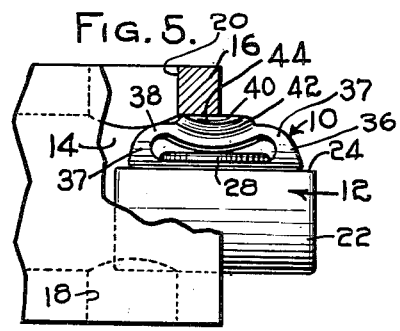
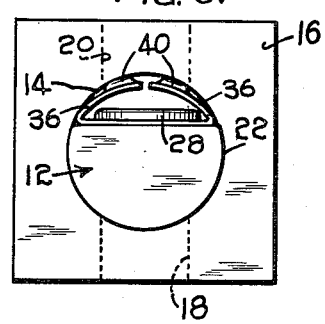
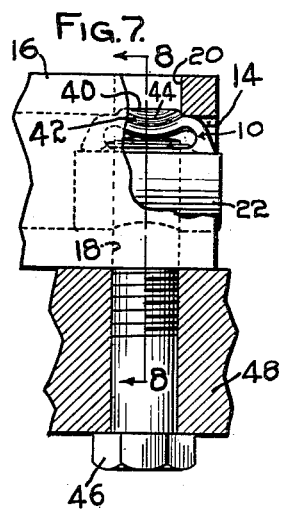
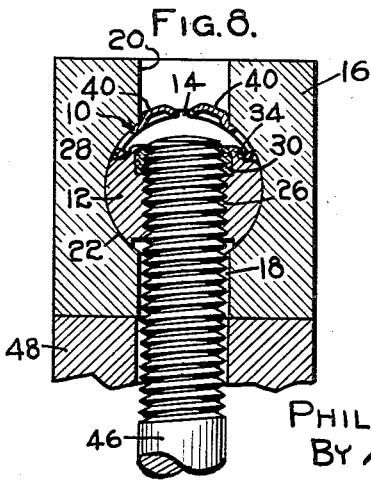
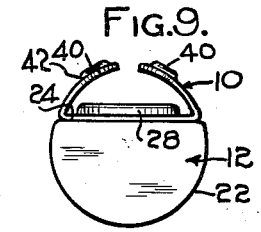
INVENTOR:
PHILIP D. BECKER,
BY Robert E. Ross
AGENT.

United States Patent Office 2,825,379
Patented Mar. 4, 1958

2,825,379

CYLINDRICAL NUT WITH SPRING ARM RETAINER

Philip D. Becker, Hingham, Mass., assignor, by mesne assignments, to United-Carr Fastener Corporation, Boston, Mass., a corporation of Delaware Application November 23, 1951, Serial No. 257,893

1 Claim. (Cl. 151—41.75)

This invention relates generally to structural assemblies and to nut retainers for use therein, and has particular reference to a nut retainer which is adapted for pre-assembly onto a nut for insertion into an opening in a supporting member.

In certain types of structural assemblies where weight is an important consideration, requiring that at least some of the structural elements to be formed of aluminum or magnesium and their alloys, difficulty has been encountered in providing a secure attachment between such members. In many applications, it is undesirable that a bolt extend completely through a member, however, threads provided by drilled and tapped holes in such materials have been found to have insufficient strength to provide an assembly which will resist high stresses. For this reason, it has been found convenient to provide an internal bore in such support members, with a nut disposed in the bore to receive a bolt inserted in an opening in the member extending substantially normal to the bore and connecting thereto. With such a structure, it is necessary to provide means for retaining the nut in the bore until assembly of the bolt, and such means must also properly align the nut into a proper position to receive the bolt.

The object of the invention is to provide a nut retainer for assembly with a nut into an internal bore of a support member to retain the nut in assembly therewith and to automatically align the nut with a bolt-receiving opening in the support.

A further object of the invention is to provide a nut retainer in which a pair of resilient arms disposed over a base for seating on the nut are narrowed gradually toward their opposing free ends to facilitate insertion of the assembled nut and retainer into the internal bore of a support.

A still further object of the invention is to provide a nut retainer in which a base for seating on the nut is provided with upwardly and inwardly rounded resilient arms having upwardly embossed portions disposed thereon for snapping engagement into a recess in the internal bore of a support to position a nut assembled with the retainer into alignment with a bolt-receiving opening in the support.

Other objects of the invention will, in part, be obvious, and will, in part, appear hereinafter.

In the drawing:

Fig. 1 is a top plan view of a nut retainer embodying the features of the invention;

Fig. 2 is an end view of the nut retainer of Fig. 1;

Fig. 3 is a top plan view of a nut for use with the nut retainer of Fig. 1;

Fig. 4 is an end view of the nut shown in Fig. 3;

Fig. 5 is a view of the assembled nut and nut retainer illustrating the method of assembly into the internal bore of a support;

Fig. 6 is a view of Fig. 5 as seen from the right side;

Fig. 7 is a view of the nut retainer and the nut completely assembled into the bore of a support, and a structural member attached thereto by means of a bolt;

Fig. 8 is a view in section taken on line 8—8 of Fig. 7; and

Fig. 9 is an end view of the assembled nut and nut retainer.

Referring to the drawing, there is illustrated a nut retainer 10, which is adapted for mounting onto a nut 12 for assembly into the internal bore 14 of a structural member 16.

The member 16, which may be formed of aluminum, magnesium, or their alloys, is also provided with a substantially cylindrical bolt-receiving opening 18 which extends substantially normal to the internal bore 14 and connects thereto, and a recess 20 disposed opposite the inner end of the opening 18. In the illustrated embodiment, the recess 20 is provided by an opening extending to the outside of the member 16, for a purpose to be hereinafter described. The nut 12 for assembly into the bore is provided with a lower periphery 22 which is rounded to conform to the shape of the internal bore, and has an upper surface 24 which is substantially flat. That is, the nut is in the form of a segment of a circular cylinder the bases of which are major segments of a circle. The threaded bolt opening 26 in the nut extends from the upper flat surface 24 through the nut radially to the lower rounded periphery 22, so that the nut may be positioned in the bore 14 with the bolt opening 26 of the nut aligned with the bolt-receiving opening 18 in the member 16. To provide means for cooperating with the retainer to hold the nut in a predetermined position, a protruding portion 28 is provided on the upper surface 24 of the nut about the opening therein. In the illustrated embodiment, the protruding portion 28 also serves to hold a fiber or plastic washer 30 in position about the end of the bolt opening 26 to provide a friction lock feature to the nut.

The retainer 10 may be conveniently formed of a single piece of resilient sheet metal, and comprises generally a flat base 32 having a central opening 34, and a pair of resilient arms 36 attached to opposite sides of the base. The arms 36 each comprise a pair of spaced arm portions 37 which are curved upwardly and inwardly, each pair being joined at their upper ends by a connecting portion 38. The connecting portions 38 are disposed opposite each other, and to provide means for engagement in the recess 20 when the retainer is assembled in the bore 14, embossments 40 are provided on each connecting portion. In the preferred embodiment, the embossments 40 are surrounded by an inclined portion 42, and the embossments are generally semicircular in shape to provide outwardly rounded peripheral portions 44, whereby when the arms are flexed so as to move the connecting portions toward each other, the two embossments cooperate to provide a substantially circular portion for fitting snugly into recess 20. The arm portions 37 of each arm 36 are inclined toward each other, whereby the overall width of each arm 36 decreases gradually from the base to the connecting portion, so that as seen from the side (see Fig. 2) the edges of the arms are inclined laterally from the end of the base toward the embossments for a purpose to be hereinafter described.

To assemble the various parts of the device, the retainer is initially mounted onto the nut with the base 32 of the retainer seated on the upper surface of the nut and the protruding portion 28 of the nut disposed in the opening 34 in the base of the retainer (see Fig. 9). After such assembly, the nut and retainer, as seen from the end, have a substantially circular outline, however, the normal position of the resilient arms 36 is such that at least the embossments 40 are spaced from the bottom of the nut a distance greater than the diameter of the bore 14. The nut and retainer may then be inserted into the bore (see Figs. 5 and 6) so that the connecting portions 38 are flexed downwardly toward the base 32 to permit the embossments to pass into the bore.

The downward movement of the embossments during assembly is achieved by a combination of flexing of the arms 36 and longitudinal flexing of the connecting portion itself. The flexibility of the connecting portion is particularly desirable, since flexing of the arms 36 may result in direct abutting of the extreme ends thereof, which would prevent further downward movement of the embossments and cause to be retained to bind in the bore entrance during assembly, unless the connecting portion is capable of further independent downward flexing. If the arms extend upwardly from the base far enough that the edges thereof contact the edges of the support about the bore entrance, the inclined edges of the arms will assist in forcing the arms to flex downwardly without the necessity of forcing the arms together by other means. The inclined portion 42 disposed about the embossments acts as a camming surface to allow the embossments to pass into the bore without binding. The nut and retainer may then be slid along inside the bore until the embossments 40 snap upwardly into the recess 20 properly position the nut to receive a bolt 46 inserted through the transverse opening 18 (see Figs. 7 and 8). Since the embossments 40 are shaped to fit snugly into the recess, the retainer will not be firmly engaged therewith unless the nut opening is in suitable alignment with the bolt-receiving opening in the support. After such assembly, the bolt 46 may be inserted through the opening 18 for engagement with the nut, to attach another structural member 48 to the support 16.

It will be apparent that the retainer as shown in Figs. 1 and 2 may be easily and accurately made by mechanical means since a strip of metal of a suitable width and of a length corresponding to the perimeter of the finished article as seen in Fig. 2 may be stamped in the flat to provide the opening 34 which passes the bolt, the openings which define the arms 37, the connecting portion 38 and the embossments 40 of said portions and portions of the strip may then be inbent about a mandrel having a cross section corresponding to the segment of the cylinder complementary to that of the nut and withdrawn over the end of the mandrel since the internal surfaces viewing Fig. 2 present no obstructions.

It will be understood that if required, a series of transverse bolt-receiving openings and recesses may be provided in the support, and the nuts and retainers may be assembled therewith from one end of the support by pushing them along the bore, with the spring arms of the retainer snapping from one recess to the next until it has arrived in the proper position.

Since the recess 20 is provided by an opening extending to the outside of the support, it is apparent that the assembly may be adapted to secure the member 48 from either side of the support, since the bolt may be inserted from either side of the support, in which case the position of the nut can be reversed from the position illustrated, with the opening 18 providing the recess to receive the embossments.

Since certain other obvious modifications may be made in the device without departing from the scope of the invention, it is intended that all matter contained herein be interpreted in an illustrative and not in a limiting sense.

I claim:

In combination with a body having two intersecting cylindrical bores to receive respectively a nut and a bolt threading into the nut, of a nut having the form of a cylinder cut away along one side to provide a cylindrical surface to bear on its bore and a generally flat base portion having the position of a secant plane therein, the nut having a threaded bore opening perpendicularly to the base portion and a raised ridge on the base surrounding that bore, and a retainer element comprising a strip of resilient metal having a base provided with an opening to pass said ridge and fit about the same and side portions inbent to lie substantially as continuations of the cylindrical surface, said side portions including relatively narrow spaced arms at the ends of the base, the arms at each side having connecting portions between their distal ends, said connecting portions having centrally located thereon embossments which, when the arms are unstressed, project outwardly beyond the continuation of the cylindrical surface, the embossments having laterally presented shoulders contoured to fit the bolt-receiving bore and rounded end surfaces which when the assembled nut and retainer are thrust into the end of the nut-receiving bore develop a force stressing the arms inwardly to permit the entry of the assembly within the bore and subsequent reaction to position the shoulders within the relatively transverse bore, the interiorly presented faces of said side portions and the opposed face of the base being free of inward projections.

References Cited in the file of this patent
UNITED STATES PATENTS

| | | |
|---|---|---|
| 1,139,819 | Smith | May 18, 1915 |
| 1,671,757 | Allen | May 29, 1928 |
| 2,326,285 | Burke | Aug. 10, 1943 |
| 2,336,319 | Tinnerman | Dec. 7, 1943 |
| 2,391,046 | Tinnerman | Dec. 18, 1945 |
| 2,596,056 | Tinnerman | May 6, 1952 |
| 2,705,663 | Connett | Mar. 8, 1955 |